Jan. 6, 1942.　　　F. H. GIVEN　　　2,268,869

BEARING MEMBER

Filed June 28, 1941

INVENTOR.
Fred H. Given
BY Davis, Lindsey, Smith & Shontz
ATTORNEYS

Patented Jan. 6, 1942

2,268,869

UNITED STATES PATENT OFFICE 2,268,869

BEARING MEMBER

Fred H. Given, Brightwaters, N. Y., assignor to The Perfect Circle Company, Hagerstown, Ind., a corporation of Indiana Application June 28, 1941, Serial No. 400,309

9 Claims. (Cl. 308—239)

My invention relates to bearing structures or members, fixed or movable rotarily or reciprocally.

The principal object of my invention is to provide a bearing structure or member capable of carrying comparatively greater loads while at the same time surface wear is reduced, scoring and scuffing prevented and life increased.

The orthodox manner of attempting to maintain the desired smooth working relation between such bearing parts is by ordinary lubrication. However, attempts to lubricate bearing surfaces under conditions of "boundary" lubrication, such as exist in internal combustion engines, for example, have not succeeded in preventing excessive or non-uniform wear of the contacting surfaces. It has also been proposed to coat some bearing surfaces with metal such as tin, lead, zinc or copper, but such schemes have not proven to be very successful in all respects, particularly because of their limitations as to load carrying capacity.

To accomplish the object of my invention I provide the bearing face of a bearing structure with small, narrow or restricted bearing areas separated by bodies permanently embedded in the bearing face and formed of abrasive metallic oxide particles permanently bonded together.

I also preferably, though not necessarily, coat the restricted bearing areas of such bearing structure with a film of abrasive metallic oxide. The oxide which I prefer to use is black magnetic oxide of iron.

Further objects of my invention and the advantages flowing from the same become apparent from the following description taken in conjunction with the accompanying drawing, in which.

Figure 1:
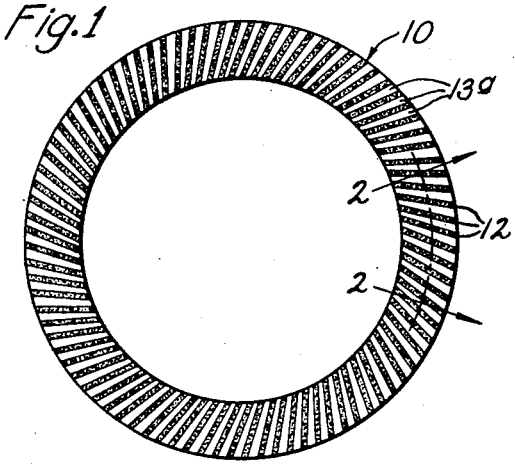
Figure 1 is a plan elevation of a thrust bearing embodying my invention.
Figure 2:
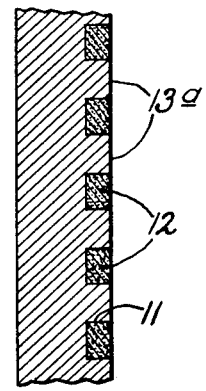
Fig. 2 is a fragmentary section through the thrust bearing shown in Fig. 1, the section being taken as on the line 2—2.

Referring to the thrust bearing washer shown in Figs. 1 and 2, the washer 10 is preferably formed of metal and preferably of cast iron. In its broader aspects, I do not wish to limit my invention to bearing members formed of cast iron or other metals, as the bearing members may be made of other hard moldable substances, such, for example, as Bakelite. Bearing areas 13$^a$, preferably inclined to the radius of the washer, are formed on the bearing face, the grooves or cavities 11 between such areas being formed at the time the washer is cast, molded or otherwise formed, or being provided by a cutting or machining operation after the washer is formed. The bearing areas 13$^a$ are very narrow and very closely spaced apart.

The spaces between the bearing areas 13$^a$ are filled with a mixture 12 formed of an abrasive metallic oxide, bonded together by a suitable bonding material. I have found that a mixture formed of black magnetic iron oxide ($Fe_3O_4$ or ferroso-ferric oxide) and sufficient sodium silicate in a liquid or pulverized form as a binding agent acts admirably in carrying out the purpose of my invention. I preferably use finely divided or pulverized black magnetic oxide of iron and sodium silicate in liquid or pulverized form in proportions of 70% and 30% respectively. The mixture may be of any suitable degree of fineness but I prefer material no coarser than that which will pass through an 80 mesh screen.

The mixture with a suitable liquid vehicle added is quite viscous in form and is readily packed in the cavities or grooves, preferably in such manner as to avoid porosity. The compound is then allowed to dry and set, after which the washer may be heated at a temperature of about 600° F. to insure that the mixture is dry.

I have also found it desirable in some instances to add glycerine to the mixture to retard too rapid setting of the sodium silicate and in such cases I use approximately 70% of the oxide of iron, 20% of the sodium silicate and 10% of the glycerine. The glycerine reduces the porosity of the mixture when it is used because it permits the sodium silicate to set more slowly and hence permits any entrapped air to escape more easily.

Figure 3:
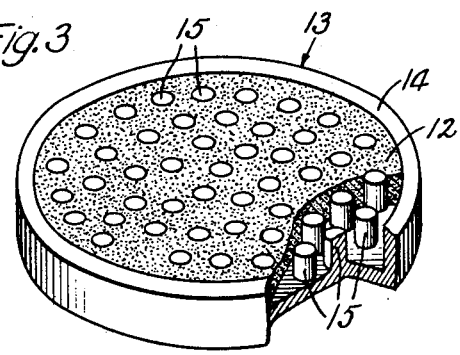
Fig. 3 is a perspective view of another thrust bearing embodying my invention, the bearing being partly broken away.

Fig. 3 shows a thrust bearing 13 which is cast with a narrow rim 14 and small circular projections 15 suitably arranged and spaced within the rim so that the outer edge of the rim and the faces of the projections provide restricted or limited bearing areas. The cavities or spaces within the rim and between the projections are then filled with the abrasive metallic oxide as already explained in connection with the washer shown in Figs. 1 and 2.

Figure 4:
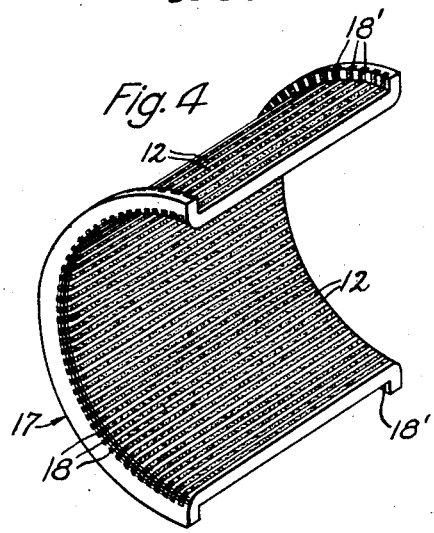
Fig. 4 is a perspective view of one-half of a journal bearing embodying my invention.

Fig. 4 shows a half of a journal bearing 17 provided with small bearing areas separated by grooves or cavities 18 and 18' formed in its inner and outer peripheral surfaces, respectively, which cavities are filled with the abrasive metallic oxide as already explained.

Figure 5:
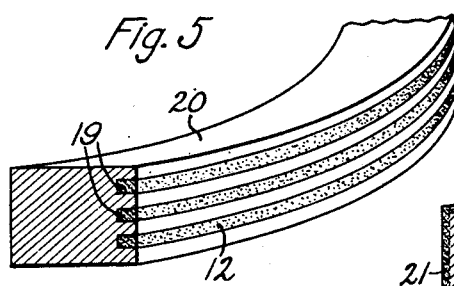
Fig. 5 is a perspective view of part of a piston ring embodying my invention.

In Fig. 5, the piston ring 20 has its bearing face its broader aspects, I do not wish to limit my grooves 19, the grooves being filled with the abrasive metallic oxide.

Figure 6:
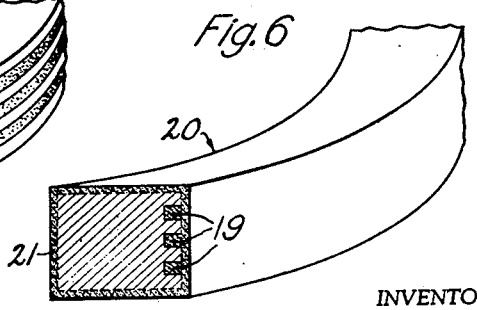
Fig. 6 is a view like Fig. 5 but additionally shows the piston ring provided with a film of abrasive metallic oxide.

Fig. 6 shows the same ring provided with a coating 21 of abrasive metallic oxide. The coating is preferably black magnetic iron oxide. To form the coating I place the ring in an oxidizing furnace where the ring is heated to a temperature of from 600° to 850° F. in the presence of steam and in the absence of air. The heating of the furnace continues and the ring is continuously subjected to the oxidizing action of the steam in the absence of air until the final temperature of from 1000° F. to about 1300° F. is reached, the time of exposure of the ring to such temperature being approximately thirty minutes. After the ring has been subjected to the temperature indicated, it is removed from the oxidizing furnace and permitted to cool. The oxide coating has a minimum thickness of .0003".

In bearing members, embodying my invention, the bearing areas, which are substantially separated or surrounded by the bodies of abrasive metallic oxide, are very narrow, restricted or small in size, and preferably not over .050" wide or in diameter, as the case may be. The bodies of the metallic oxide are preferably .015" deep or more. When the bearing surface is provided with grooves, as illustrated in several of the accompanying figures, the grooves are also preferably quite restricted in width. In short, it is highly desirable to have the bearing areas and the bodies of oxide as restricted or limited in width as is feasible within manufacturing or production limits. With respect to the piston ring such as shown in Fig. 5, I find that a ring ⅛" wide (at the face) gives remarkable results when each bearing area is .016" wide and each oxide body is .020" wide and .020" deep.

Obviously the form of the alternate or spaced bearing areas and oxide bodies may vary greatly over a wide range. In using the term "groove" or "cavity," I intend to include any groove, cavity, depression, recess, or the like, of any desired form adapted to be filled in accordance with my invention.

I have found by actual experience and demonstrative tests that bearing members constructed in accordance with my invention are adapted to carry much greater loads than bearing members of comparable size not embodying my invention. Even when carrying greater loads, scuffing or scoring of the bearing surfaces of my bearing members is eliminated, which materially increases their effective life. For example, I have tested under the same conditions a washer similar to that shown in Fig. 1 and a plain washer of the same material, size and shape. The total load in each instance was 150 pounds and each washer was rotated at a speed of 60 R. P. M. against a plain stationary washer of the same size and material, no lubrication being employed. The plain washer scuffed badly in one minute and 40 seconds, while my washer was in perfect condition at the end of 24 hours.

I would point out here that if the bearing material is ferrous a coating of black magnetic oxide may be formed on the bearing surface, as explained in connection with piston rings shown in Fig. 6, thus adding to the life and load carrying capacity of the bearing. While I have only referred to this coating in connection with the piston ring shown in the drawing, it is to be understood that any ferrous metal bearing member may be provided with such coating.

While black magnetic oxide of iron has been found to give extremely satisfactory results in actual practice, I also contemplate the use of other abrasive metallic oxides having low heat conductivity such as tin oxide, aluminum oxide, zinc oxide, etc., in grooves or cavities of bearing members in finely divided form and bonded together by a binding agent.

This application is a continuation in part of my co-pending application, Serial No. 328,312, filed April 6, 1940.

I claim:

1. A bearing member having its bearing face provided with a plurality of closely spaced small, narrow or restricted bearing areas separated by cavities or grooves and bodies filling the cavities or grooves, the bodies being formed of finely divided particles of abrasive metallic oxide and material permanently bonding the particles together in a solid mass and causing the bodies to be permanently held in the cavities or grooves.

2. A bearing member having a plurality of bearing areas in its bearing face separated by grooves, the bearing areas being not over .050" wide and the grooves being not over .020" wide and at least .015" deep, and bodies filling the grooves and formed of finely divided particles of abrasive metallic oxide and material permanently bonding the particles together in a hard, solid and dry mass and causing the bodies to be permanently held in the grooves.

3. A bearing member having its bearing face provided with a plurality of small, narrow or restricted bearing areas substantially separated or surrounded by bodies permanently embedded in the bearing face and formed of finely divided particles of aluminum oxide permanently bonded together in a solid mass by a bonding material.

4. A bearing member having a plurality of small, narrow or restricted bearing areas in its bearing face and provided by closely spaced cavities or grooves, and bodies filling the cavities or grooves and formed of finely divided abrasive particles of aluminum oxide permanently bonded together into a hard solid mass by sodium silicate.

5. A bearing member having in its bearing face a plurality of bearing areas separated by grooves, the bearing areas being not over .050" wide and the grooves not being over .020" wide and at least .015" deep, and bodies permanently filling the grooves and formed of fine abrasive particles of aluminum oxide and sodium silicate bonding the particles together in a hard solid and dry mass and causing the bodies to be permanently held in the grooves.

6. A bearing member having its bearing face provided with a plurality of small, narrow or restricted bearing areas substantially separated or surrounded by bodies permanently embedded in the bearing face and formed of finely divided particles of tin oxide permanently bonded together in a solid mass by a bonding material.

7. A bearing member having a plurality of small, narrow or restricted bearing areas in its bearing face and provided by closely spaced cavities or grooves, and bodies filling the cavities or grooves and formed of finely divided abrasive particles of tin oxide permanently bonded together into a hard solid mass by sodium silicate.

8. A bearing member having in its bearing face a plurality of bearing areas separated by grooves, the bearing areas being not over .050" wide and the grooves not being over .020" wide and at least .015" deep, and bodies permanently filling the grooves and formed of fine abrasive particles of tin oxide and sodium silicate bonding the particles together in a hard solid and dry mass and causing the bodies to be permanently held in the grooves.

9. A bearing member having its bearing face provided with a plurality of small, narrow or restricted bearing areas substantially separated or surrounded by bodies permanently embedded in the bearing face and formed of finely divided particles of zinc oxide permanently bonded together in a solid mass by a bonding material.

FRED H. GIVEN.